3,695,839
PROCESS OF PRODUCING CHLORINE DIOXIDE
Joseph Callerame, Rochester, N.Y., assignor to Chemical Generators Inc., Rochester, N.Y.
No Drawing. Filed Apr. 27, 1970, Ser. No. 32,366
Int. Cl. C01b 11/00; C01d 9/16; C01f 11/36
U.S. Cl. 423—479                          5 Claims

ABSTRACT OF THE DISCLOSURE

Chlorine dioxide is produced by passing the reaction product of nitric acid and a chlorate of an alkali metal or alkaline earth metal through a cationic exchange resin or by heating the reaction product at a temperature of about 110° C. The reaction product of nitric acid and the chlorate contains chloric acid which may be utilized per se.

SUMMARY OF THE INVENTION

The invention generally relates to the production of chloric acid and chlorine dioxide.

It has been found that the chlorates of alkali metal or alkaline earth metal react with nitric acid to form chloric acid and the corresponding nitrate. As applied to sodium chlorate, for example, the reaction proceeds in molar or stoichiometric proportions as follows:

$$NaClO_3 + HNO_3 \rightarrow NaNO_3 + HClO_3$$

If the chloric acid thus formed is thereafter brought into ion exchange contact with a cationic exchange resin in the hydrogen form or the like hydrogen source, chlorine dioxide is formed according to the following reaction scheme:

$$HClO_3 + H^+ \rightarrow ClO_2 + H_2O$$

It will thus be noted that one mole of chloric acid forms one mole of chlorine dioxide. No free chlorine is formed in this manner. The ion exchange contact is advantageously accomplished by passing the nitric acid-chlorate mixture through a cationic ion exchange column.

The chlorine dioxide, which is formed in the form of an aqueous solution, to wit admixed with water, can of course be easily expelled from the solution by heating. The solution, however, will also contain the corresponding metal nitrate. With a view to obtaining a pure solution it is therefore advantageous to remove the nitrate. This can be easily accomplished by contact with an anionic exchange resin, for example, an exchange resin in the OH form. Srom the practical point of view it is advantageous to pass the nitric acid-chlorate mixture first through the anionic exchange resin thereby to remove the nitrate. In this manner, a pure chlorine dioxide containing solution is obtained.

However, it has also been found that chlorine dioxide can be obtained directly from the reaction product of nitric acid and the chlorate without passing the reaction mixture through an exchange column. This is accomplished by heating the reaction mixture at a temperature of about 110° C.

The invention will now be described by several examples it being understood, however, that these examples are given by way of illustration and not by way of limitation and that many changes may be effected without affecting the scope and spirit of the invention as recited in the appended claims.

EXAMPLE 1

106 g. of $NaClO_3$ were mixed with 90 g. of 70% nitric acid. The reaction mixture thus obtained was passed through an ion exchange column containing 100 g. of a packed cationic resin whose active sites were in the hydrogen form. The eluate was collected and the resin was washed with distilled water. The wash water was added to the eluate. The total amount of liquid thus obtained was diluted to one liter and compared at 340 m$\mu$ on a Beckman DBG. The absorption values were compared with a standard curve. It was ascertained that 80 g. of $ClO_2$ were recovered which corresponds to 95.2%. The chlorine dioxide was removed from the solution by aeration and the remaining solution was tested for nitrates. The test was positive.

EXAMPLE 2

The procedure of Example 1 was repeated but before passing the reaction mixture through the cationic exchange column, the mixture was passed through 20 g. of an anionic exchange resin in the OH form which was placed on top of the cationic exchange column. The resulting yield corresponded to 95.1% of chlorine dioxide. The aerated solution was negative for nitrates.

EXAMPLE 3

212 g. of $NaClO_3$ were mixed with 90 g. of nitric acid. The mixture was passed through a column containing 200 g. of a packed cationic exchange resin in the hydrogen form. The eluate was collected, the resin was washed with distilled water and the wash water was added to the eluate. The liquid thus obtained was compared against a standard curve. 80 g. of chlorine dioxide were recovered. It was found that an increase in the amount of chlorate in the reaction mixture had no significant effect on the reaction course or the yield.

EXAMPLE 4

106 g. of sodium chlorate were mixed with 90 g. of nitric acid. The mixture thus obtained was passed through a column containing 200 g. of a cationic exchange resin in the hydrogen form. The eluate was collected and the resin was washed with distilled water. The wash water was added to the eluate. The combined liquid thus obtained was compared spectro-photometrically. 85 g. of chlorine dioxide were recovered. It was found that an increase in the amount of nitric acid has an insignificant effect on the reaction course and the yield.

EXAMPLE 5

206 g. of calcium chlorate $Ca(ClO_3)_2$ were mixed with 90 g. of nitric acid of 70% concentration. The mixture was passed through a cationic exchange column and the procedure described in Example 1 was repeated. 162 g. of chlorine dioxide were recovered corresponding to a yield of about 95%.

EXAMPLE 6

303 g. of barium chlorate $Ba(ClO_3)_2$ was mixed with 90 g. of nitric acid of 70% concentration. The procedure, outlined in Example 1, was repeated. 163 g. of chlorine dioxide were recovered corresponding to an approximate yield of 95.1%.

EXAMPLE 7

106 g. of sodium chlorate $NaClO_3$ were mixed with 90 g. of nitric acid in a glass beaker. The mixture thus obtained was loosely covered by a glass plate and carefully and slowly heated to 110° C. The resulting solution was diluted to one liter and compared spectro-photometrically against a standard $ClO_2$ curve. It was found that 52 g. of chlorine dioxide had formed corresponding to a yield of about 95.4%. The solution was then aerated by passing air therethrough and the remaining solution was tested for nitrate. The test was positive. It is believed that the reaction proceeded according to the following reaction mechanism:

$$3HClO_3 \rightarrow HClO_4 + 2ClO_2 + H_2O$$

It will be noted that in this experiment three moles of sodium chlorate were required to produce two moles of chlorine dioxide.

The cationic resins used in the preceding experiments were of the styrene, divinyl benzene type with strong acid groupings. The size of the resin beads was about 0.04 mm. to 1 mm. in diameter. The columns were in the form of polyethylene cones in which the resin was packed. The solutions were gravity fed. In respect to the anionic exchange resins, the following resins were used: same as in respect to cationic but in the OH form.

The ion exchange contact is advantageously accomplished in conventional equipment. For example, the procedure may be carried out in a column arrangement of polyethylene with polyvinyl chloride valves and tubings. The nitric acid and the chlorate solutions are advantageously supplied to the column from separate storage vessels. The reactants are fed to the column through tubings leading from the storage vessels, the tubing from the nitric acid vessel joining that from the chlorate containing vessel before the reactants reach the column. The reactants are thus preferably mixed before they enter the column and suitable valving and dosage devices may be provided to control the flow of the reactants in the proper amounts. The reactants thus are allowed to react to form the chloric acid outside the column. If the nitrate is to be removed, it is advantageous that the nitrate containing chloric acid system is first passed through a column containing anionic exchange resin in the OH form. The nitrates are thus removed and the eluate from the anionic exchange resin is then fed to the actionic exchange resin proper. The eluate from the cationic exchange resin may then be conveyed in any suitable manner to a place of use or to storage. The anionic and cationic exchange resins are preferably separated so as to facilitate regeneration of the resins. However, it would be feasible to use a column containing mixed anionic and cationic resins. The column or columns are preferably provided with water inlets for washing purposes thereby to increase the yields.

What is claimed is:

1. A process of producing chlorine dioxide which comprises reacting nitric acid with a chlorate of an alkali metal or alkaline earth metal in the presence of water, whereby a reaction product essentially consisting of $HClO_3$ and alkali metal nitrate or alkaline earth metal nitrate dissolved in water is obtained, bringing said reaction product dissolved in water into ion exchange contact with a cationic exchange resin whose active sites are occupied by hydrogen, whereby chlorine dioxide dissolved in water is obtained.

2. A process as claimed in claim 1, wherein the chlorine dioxide is expelled from the water by heating.

3. A process as claimed in claim 1, wherein the reaction is carried out in stoichiometric amounts.

4. A process as claimed in claim 1, wherein said ion exchange contact is accomplished by passing said reaction product through an ion exchange column containing said resin.

5. A process as claimed in claim 1, wherein said reaction product is brought into ion exchange contact with an anionic exchange resin before the contact with said cationic resin, whereby nitrate is removed from said reaction product.

References Cited

UNITED STATES PATENTS

| | | | |
|---|---|---|---|
| 2,616,792 | 11/1952 | Marks et al. | 23—152 |
| 2,641,528 | 6/1953 | Audoynaud | 23—152 |
| 2,344,346 | 3/1944 | Evans | 23—152 R |
| 2,451,826 | 10/1948 | Haller | 23—152 R |

FOREIGN PATENTS

| | | | |
|---|---|---|---|
| 791,680 | 3/1958 | Great Britain | 23—152 |

OTHER REFERENCES

"Treatise on Inorganic Chemistry," by H. Remy, vol. 1, 1956 ed., p. 805. Elsevier Pub. Co., New York.

EDWARD STERN, Primary Examiner

U.S. Cl. X.R.

423—399